United States Patent [19]

Wiegand

[11] Patent Number: 4,577,192
[45] Date of Patent: Mar. 18, 1986

[54] ELECTRONIC COUNTERMEASURES FALSE TARGET SYSTEM

[75] Inventor: Richard J. Wiegand, Severna Park, Md.

[73] Assignee: The United States of America as represented by the Secretary of the Air Force, Washington, D.C.

[21] Appl. No.: 808,048

[22] Filed: Mar. 14, 1969

[51] Int. Cl.[4] .............................................. G01S 7/38
[52] U.S. Cl. .................................................. 343/18 E
[58] Field of Search ................................ 343/18, 18 E

[56] References Cited

U.S. PATENT DOCUMENTS

| | | | |
|---|---|---|---|
| 2,561,363 | 7/1951 | Haeff et al. | 343/18 E |
| 3,015,096 | 12/1961 | Deloraine et al. | 343/18 E |
| 3,568,194 | 3/1971 | Wilson et al. | 343/18 E |
| 3,858,219 | 12/1974 | Hull | 343/18 E X |
| 3,891,989 | 6/1975 | Barney et al. | 343/18 E |

Primary Examiner—T. H. Tubbesing
Assistant Examiner—John B. Sotomayor
Attorney, Agent, or Firm—Donald J. Singer; Willard Matthews, Jr.

[57] ABSTRACT

There is disclosed herein a method of applying an active electronic countermeasure (ECM) False Target technique against MTI staggered pulse threat radar. This is accomplished by radar circuits which digitally transfer false target arrays grouped about low pulse repetition frequency (PRF) pulses to high PRF pulses, when they are present. The circuits of the invention then phase shift each transferred array with respect to the fundamental system clock rate to achieve proper alignment.

3 Claims, 3 Drawing Figures

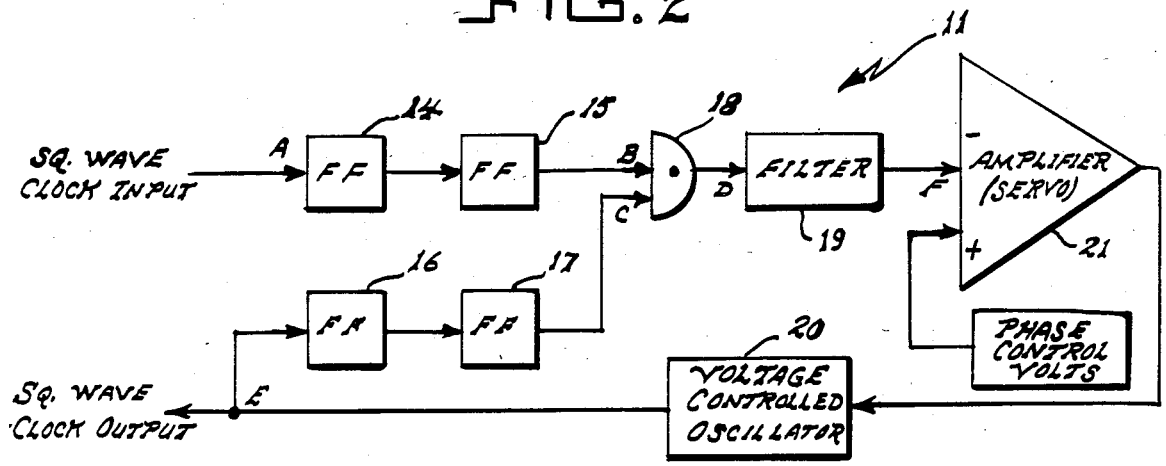
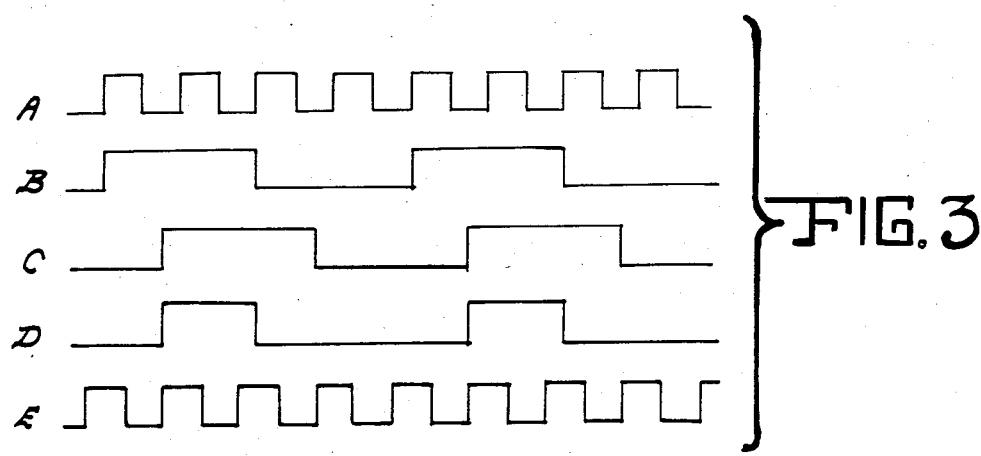

ELECTRONIC COUNTERMEASURES FALSE TARGET SYSTEM

BACKGROUND OF THE INVENTION

Electronic countermeasures deception systems are, in certain instances, required to generate an array of false targets in angle and range against the threat TWS type radar. The angle program can be accomplished by phase locking an angle clock to the incoming scan rate. The clock has a high basic frequency that is counted down, and the various counts then form the angular positions. However, some aspects of positioning the targets in range are not as easily accomplished.

The video circuitry of such a deception system sees a pulse train at a nominal 1 KHZ rate derived from the RF pulses coming from the threat radar. The repetition rate is determined by the electromagnetic propagation velocity to give the radar an unambiguous range of approximately 90 miles. When the illuminated aircraft is relatively close to the site, typically less than 30 miles, the radar usually changes its mode to double the PRF. This gives a higher data rate to their servos so that the site can launch its surface to air missiles. The time from the trigger point of their transmission till the returning echo is received determines the range as far as the radar is concerned. The way the ECM creates the illusion of other targets in range is by generating pulses of the same RF frequency before and after the radar pulse, and of course having the appropriate angle modulation. For instance, using the approximation that a foot is transversed in a nanosecond at the speed of light, then if the ECM generates a pulse eight microseconds after the radar pulse impinged on the aircraft, the radar will think it sees a second craft four thousand feet behind the plane.

In order to generate these pulses to follow the threat radar pulses, it is possible to simply use timing multivibrators. If the timing is long enough then the position will be close to the next pulse that is due from the radar, so the radar site operators will think that this ECM pulse is a target just in front of the true range. However this method of generating leading targets is not practical since although the PRF is known approximately, there can be variations within this region. If it is desired to always put a pulse out just a few microseconds before the expected radar pulse, then the fixed timing multi vibrators are grossly inadequate. For this reason an analog-digital hybrid range clock that phase locked to the input pulse train has been used. The voltage controlled oscillator of this system runs at a much higher rate then the input and is counted down. Early and late gates provide the error signals for constant phase and frequency correction. The loop inertia is such that false triggers (usually in the early gate period) generally do not cause the acquisition on the original pulse train to be broken, and the stable point of the loop is also the error level null point so that the tracker can even hold through periods of missing pulses. The various counts from this clock then, serve as the trigger points for the range positions. Therefore any range position is available through the period provided that it is a multiple of the oscillator period from the input trigger point. For example, the clock period can be taken as four microseconds, so that the count just before the true range clock can be used to seemingly put a target two thousand feet in front of the aircraft independent of the exact radar PRF. If the pulse rate is different, then the range clock will just have a different number of counts to fill the interpulse period, and the first preceeding count will still lead by four microseconds.

Therefore, for the low PRF case, the above mentioned use of a range clock provides an excellent method of generating the false target in range program. The region of lock-up can be set to cover all the low PRF possibilities. Now if the radar switched to high PRF mode by exactly doubling its frequency, then the ECM logic program could determine the mid count and place the same array of targets around it as there were around the low PRF pulse, at least it could if it were ensured that there were an even number of counts in the interpulse period. Therefore it would not be much of a problem to handle the high PRF mode.

This high PRF mode capability, however, is complicated by the fact that when the radar switches to this mode the average pulse repetition rate does exactly double, but the high pulses are not placed midway between the low pulses. This is because the radar has an MTI capability in order to get a measurement of the aircraft velocity. By staggering the pulses, typically the low period is divided by a thirteen units to twelve units ratio, they eliminate much of the beating effect between the doppler shift and the pulse rate. Since delay lines or their equivalent are used to accurately measure the differences between successive pulses, the interval from the low pulse to the high pulse is very precise for each site, although the ECM system may not know exactly where it will appear in the period.

One approach toward solving this problem has been to use two identical range clocks, one of which would lock to the low PRF, and the other to lock to the high PRF pulses, if they were present. This approach is unsatisfactory, however, because if the basic oscillators of the two clocks differed in frequency by just a small fraction of one percent, then there would be a different number of counts in each set of counters that measured the interpulse period.

Accordingly, it appears that the basic oscillator frequency of the primary range clock must be employed to handle the high pulses. However, it was not known how many counts in the interval from the low to the high pulse would exist. This can be mechanized of course by the same count determination technique used in the primary range clock. The problem is that in general there would not be an exact interger of counts in this interval. If this clocking square wave were used to position the false targets around the high pulse, then substantial error may be introduced, with a maximum possible error being one half the clock period.

An alternative approach has been to use a bank of four gang tuned voltage controlled multi vibrators. If the clock period is four microseconds, then each multi vibrator would have a timing cycle of from two to six microseconds, with a minimum of two microseconds recovery time. The first multi vibrator is triggered off every other positive edge of the clock waveform giving 360 degree operation. The output of this circuitry is a reconstructed square wave of variable phase with respect to the input.

The bank of four multi vibrators approach, however, is difficult to implement successfully. In the first place it barely covers 360 degrees operating range. In the second place two of the multis trigger off the opposite polarity edge of the clock waveform which means that the design of all four will not be identical. Overall it is very difficult to get a symmetric looking square wave from the circuit. With the same control voltage applied to them, they did not have equal timing cycles. If they are made equal at one voltage, it does not ensure that they would track properly. Consequently, although ganged multi vibrators can be made to work, the alignment procedure is very involved, and the number of adjusting potentiometer prohibitive.

SUMMARY OF THE INVENTION

This invention comprehends a method of applying an ECM False Target Technique against an MTI staggered pulse threat radar. The false targets in range that are grouped around the high PRF pulses of the threat radar must have as an identical a timing sequence with respect to the origin pulse as the array around the low PRF pulses as possible, despite the fact that the high pulses are not centered midway between the low pulses. The low target array is derived from a phase locking, PRF tracking, range clock that counts down from a high clock frequency creating the many possible range positions with, unfortunately, the expanded range scale resolution of the radar being much finer than this clock period.

Realization of these requirements is uniquely achieved by the invention through the use of a phase shifter acting upon the basic clock rate of the master range clock that locks to the low PRF pulses. The phase shifter input and output are divided down once or twice to give ±180 degrees or ±360 degrees dynamic region respectively, and these two waveforms are combined in an AND gate whose output is filtered. An amplifier compares the filtered level with a control voltage to tune a voltage tuned oscillator and close this sub-loop. The control voltage comes from a second, or high, range clock that is very similar to the master range clock. The principle difference between the two, and the salient point of this invention is that the low master range clock servo directly tunes the basic voltage controlled oscillator frequency, while the high slave range clock tunes the phase of its square wave clock output with respect to this basic voltage controlled oscillator frequency. The net result is that the false target array is transferred approximately to the high pulse position by duplicated digital circuitry, and then slipped in phase for proper alignment.

It is a principle object of the invention to provide a new and improved electronic countermeasures system that is adapted to present false target information to MTI staggered pulse radar.

It is another object of the invention to provide an electronic countermeasures system of the type described that incorporates apparatus for accurately and reliably positioning false targets for both high and low PRF MTI threat situations.

It is another object of the invention to provide an electronics countermeasures system of the type described wherein false targets in range that are grouped around the high PRF pulses of a threat radar have substantially an identical timing sequence with respect to the origin pulse as the array grouped around the low PRF pulses.

These objects, together with other advantages and features of the invention, will become more apparent from the following detailed description taken in conjunction with the illustrative embodiments in the accompanying drawings.

DESCRIPTION OF THE DRAWINGS

FIG. 2 is a block diagram of the phase shifters of FIG. 1; and

FIG. 3 illustrates the waveforms that appear at various points in the circuit of FIG. 2.

DESCRIPTION OF THE PREFERRED EMBODIMENT

Figure 1:
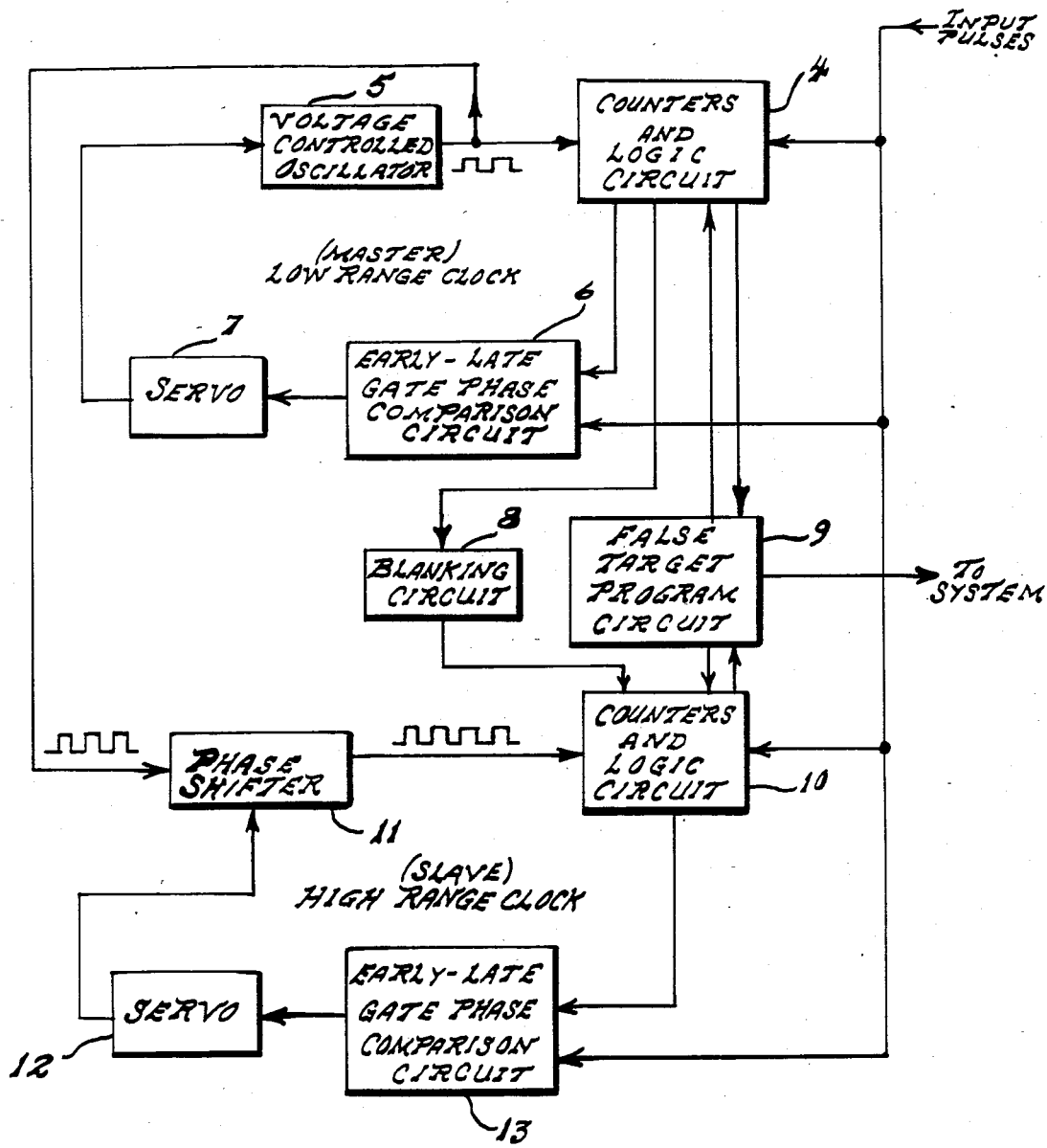
FIG. 1 is a block diagram of apparatus incorporating the principles of the invention.

The present invention is utilized in ECM systems to generate false targets in range around the high PRF pulses of the threats radar with as an idéntical a timing sequence with respect to the origin pulse as that around the low PRF pulses as possible, where these low targets are derived from a phase locking, PRF tracking, range clock. Within certain limits the basic PRF is unknown, as is the relative position of the high pulse in between the two low pulses. The high pulses taken alone are of course at an identical PRF to that of the low pulses taken alone, and at a fixed phase position.

A circuit is utilized which has a square wave input and an identical square wave output except that, according to the control voltage, the phase of the output is varied over ±360° with respect to the input. This circuit is illustrated in the block diagram of FIG. 1 by voltage controlled oscillators 5. Referring now to FIG. 1, the upper portion of the diagram comprising counters and logic circuit 4, voltage controlled oscillator 5, phase comparison circuit 6 and servo 7 represents the master range clock that will lock to the low PRF pulse train. The analog servo 7 continually changes the voltage controlled oscillator by only tiny amounts so that an exact interger number of counts will fall in the interpulse period keeping the loop stable. The count in the counters is the basic measurement of the PRF. The oscillator square wave clock rate developed thereby forms the range positions with the clock period being the smallest interval between them, permitting the false target program circuit to select the positions it wants. The oscillator square wave is sent to a high, or slave clock, comprising counters and logic circuit 10, phase comparison circuit 13 and servo 12 where it enters the phase shifter 11. The output of this lock then is considered the equivalent of an oscillator output and is employed in an otherwise identical range clock. The logic circuit of the high range clock registers the input, determines the count of the interpulse period, and generates the early and late gates for fine servo phase correction just as the master does. The difference is that the low range clock servo 7 directly tunes the basic oscillator frequency, while the high range clock servo tunes the phase of its clock with respect to the basic oscillator frequency. Blanking circuit 8 is used to ensure that the high range clock does not see the low pulses that the master is locked to. The same false target program circuit 9 is used for both range clocks since the target groups occur at separate times and do not overlap.

The false target grouping around the high pulse is now perfect because the program or array pattern is identical and also the inter target intervals are not just similar but identical. In fact the same array has been transferred and then slipped by the phase shifter until it properly aligns. If a target is placed quite far from the true range, then because of the superposition of the high and low pulses the radar will see is just as accurately as it will see a target that is very close.

Referring now to FIG. 2, there is illustrated thereby a block diagram of phase shifter 11. FIG. 3 illustrates the waveforms which appear at various points in the circuit of FIG. 2. Because input and output square waves A and E are each fed through two flip flops 14, 15 and 16, 17, respectively, that divide the frequencies by a factor of four, a total of 720° dynamic range is created. This is excellent because it ensures lock-up under all initial input conditions, and allows the master oscillator to drift in phase moderate amounts for periods of missing pulses. The circuit would also work with a single flip flop in each line, providing ±180° dynamic range. Waveforms B and C are combined in AND gate 18, which acts somewhat like a mixer. The pulse train at D thus created is converted into a dc level, as a function of pulse width, at F by filter 19. The inverting amplifier 21 then acts on the dc level compared to the reference control voltage to tune voltage controlled oscillator 20. Actually, this phase shifter is then a small closed loop within the larger loop of the high range clock. If the frequency of the voltage controlled oscillator 20 tends to increase, that is the phase tries to lead, then the leading edge of the pulse at D will move to the left making the pulse wider and raising the dc level output from filter 19. This will send it higher than the reference so that the amplifier output will tend to lower, thereby decreasing the frequency of the oscillator and correcting the initial error. The loop, therefore, is stable. If it is assumed that the output of AND gate 18 jumps between ground and V, the supply voltage, then the maximum possible output from the filter would be $\frac{1}{2}$ V for the case when B and C were exactly in phase and D was therefore a square wave. Therefore, if the output E were exactly in phase with the square wave input A at the center of its dynamic range, then F would have a $\frac{1}{4}$ V dc level. It follows, then, that a zero to $\frac{1}{2}$ V voltage span of the control voltage gives the phase shifter its ±360° scope if amplifier 21 is an operational amplifier that acts as a servo integrator. This phase shifting scheme would also work if an ordinary dc amplifier were used, although the internal levels would be different and more care would have to be taken with the frequency response of the filter as it then solely determines the loop characteristics.

In operation this small loop acquires lock immediately after the system power is turned on, and holds lock independent of whether none, one, or both of the range clocks are locked. Since the clock rate is so much higher than the PRF input rate, even when divided by four, the phase shifter circuit loop settling time can require many cycles at points B and C, and yet still be much faster than the larger loop that is restricted by its input data rate. The reaction of the phase shifter circuit to changes in control voltage will be effectively instantaneous because of the large difference in time scales. The phase shifter will consider the control voltage to be slowly varying dc as the high range clock acquires lock.

Many modifications and variations of the present invention are possible in the light of the above teachings. It is therefore to be understood that within the scope of the appended claims the invention may be practiced otherwise than as specifically described.

What is claimed is:

1. In an electronic countermeasurers deception system wherein radar pulses are generated and transmitted as constituent pulses in reflected threat radar signals, apparatus for adapting to changes in threat radar pulse repetition frequency comprising a master range clock adapted to operate at a low pulse repetition frequency, a slave clock adapted to operate at a high pulse repetition frequency, means for generating and grouping an array of false target pulses around a low pulse repetition frequency radar signal, means for digitally transferring said array of false target pulses to a high pulse repetition frequency radar signal, and means for phase shifting said transferred array with respect to the master range clock rate.

2. An electronic countermeasures system for generating false target pulses in threat radar signals comprising first and second logic circuits, each said logic circuit being adapted to register input signals, determine the count of inter pulse periods and generate early and late gates for phase correction, first and second phase comparison means respectively connected to the outputs of said first and second logic circuits, first and second servo means respectively connected to the outputs of said first and second phase comparison means, a voltage controlled oscillator connected between said first phase comparison means and said first logic circuit, phase shifting means connected between said first and second logic circuits and said second servo means, false target program means adapted to generate false target pulses connected between said first and second logic circuits, and means for delivering input pulses to said first and second logic circuits and to said first and second phase comparison means.

3. An electronic countermeasures system as defined in claim 2 wherein said phase shifting means comprises
   an input,
   an output,
   an AND gate,
   first flip-flop means connected between said input and said AND gate,
   second flip-flop means connected between said output and said AND gate,
   filter means connected to the output of said AND gate, said filter means being adapted to convert waveforms summed by said AND gate into a d.c. voltage level,
   an inverting amplifier means connected to the output of said filter means and said second servo means, said amplifier means being adapted to compare and control said d.c. voltage level with respect to the reference control voltage of said second servo means, and
   a voltage controlled oscillator, said voltage controlled oscillator being responsive to the output of said amplifier means.

\* \* \* \* \*